United States Patent [19]

Akasu

[11] Patent Number: 5,166,881
[45] Date of Patent: Nov. 24, 1992

[54] FOLLOWING CONTROL APPARATUS FOR AN AUTOMOTIVE VEHICLE

[75] Inventor: Masahira Akasu, Himeji, Japan

[73] Assignee: Mitsubishi Denki K.K., Tokyo, Japan

[21] Appl. No.: 641,410

[22] Filed: Jan. 15, 1991

[30] Foreign Application Priority Data

Jan. 17, 1990 [JP] Japan .................................. 2-9398
Jan. 20, 1990 [JP] Japan ................................ 2-10820
Jan. 20, 1990 [JP] Japan ................................ 2-10822

[51] Int. Cl.$^5$ ............................................. G06F 15/50
[52] U.S. Cl. ............................ 364/426.04; 364/461; 180/169; 180/170; 340/903
[58] Field of Search ............. 364/426.04, 460, 461; 180/170, 176-179; 123/352; 340/903

[56] References Cited

U.S. PATENT DOCUMENTS

| | | | |
|---|---|---|---|
| 4,491,840 | 1/1985 | Nishikawa et al. | 364/461 |
| 4,621,705 | 11/1986 | Etoh | 364/426.04 |
| 4,622,636 | 11/1986 | Tachibana | 364/426.04 |
| 4,670,845 | 6/1987 | Etoh | 180/170 |
| 4,703,429 | 10/1987 | Sakata | 364/461 |
| 4,706,195 | 11/1987 | Yoshino et al. | 364/461 |
| 4,757,450 | 7/1988 | Etoh | 364/461 |
| 4,969,103 | 11/1990 | Maekawa | 180/179 |
| 5,053,979 | 10/1991 | Etoh | 180/170 |

Primary Examiner—Gary Chin
Attorney, Agent, or Firm—Sughrue Mion Zinn Macpeak & Seas

[57] ABSTRACT

A following control apparatus for an automotive vehicle is disclosed which controls the output of an engine and the brakes of a vehicle so as to maintain a target vehicle separation from a preceding vehicle. A control unit calculates a target drive force for the vehicle and controls the brakes and the throttle valve of the engine so as to achieve the target drive force. In one form of the invention, the target drive force when the vehicle is starting from a standstill is calculated based on the relative speed of the vehicle and the preceding vehicle and the difference between the measured vehicle separation and the target vehicle separation when the measured vehicle separation is at least the target vehicle separation, but is calculated based on the relative speed of the vehicle independently of the vehicle separation when the measured vehicle separation is less than the target vehicle separation. In another form of the invention, the target drive force when the vehicle is starting from a standstill is calculated based on the relative speed of the vehicle and the preceding vehicle and the difference between the measured vehicle separation and the target vehicle separation, with the target drive force being greater when the vehicle speed is less than a predetermined value than when the vehicle speed is greater than the predetermined value.

13 Claims, 10 Drawing Sheets

FOLLOWING CONTROL APPARATUS FOR AN AUTOMOTIVE VEHICLE

BACKGROUND OF THE INVENTION

This invention relates to a following control apparatus for an automotive vehicle that can control the operation of a vehicle so as to maintain a safe separation from a preceding vehicle.

Recently, so-called following control apparatuses have been developed for automotive vehicles. A following control apparatus resembles a cruise control apparatus in that it controls the speed of a vehicle without the driver having to operate either the accelerator pedal or the brake pedal. However, whereas a typical cruise control apparatus merely maintains the vehicle speed constant, regardless of the movement of other vehicles on the same road, a following control apparatus controls the vehicle speed so as to maintain the separation of the vehicle from a preceding vehicle at an optimum level. The term "preceding vehicle" is used to refer to another vehicle travelling in front of and in the same direction as the vehicle being controlled.

A conventional following control apparatus includes a distance sensor for sensing the separation of the vehicle from a preceding vehicle. A target drive force for the vehicle is calculated on the basis of the measured vehicle separation, a target vehicle separation, and the relative speeds of the vehicle and the preceding vehicle. A target throttle opening corresponding to the calculated target drive force is calculated, and the throttle valve of the engine of the vehicle is controlled so as to attain the target throttle opening and therefore the calculated target drive force.

The target drive force is usually calculated using an equation such as the following one:

$$\text{Target Drive Force} = K_1 \times (\text{measured vehicle separation} - \text{target vehicle separation}) + K_2 \times \text{relative speed} \quad (1)$$

wherein $K_1$ and $K_2$ are predetermined constants.

A conventional following control apparatus performs satisfactorily when the vehicle and the preceding vehicle are traveling at nearly constant speed, such as when the vehicle is traveling on a highway. The following control apparatus makes it unnecessary for the driver to pay careful attention to his separation from the preceding vehicle, so the strain of driving is greatly decreased.

However, a conventional following control apparatus has difficulty controlling a vehicle that is starting from a standstill. When a vehicle is stopped in traffic, the separation between the vehicle and the preceding vehicle is almost never equal to the target vehicle separation, and the separation varies randomly from situation to situation. If the target drive force at starting is calculated using the above Equation (1), the target drive force will depend on the vehicle separation at the time of starting. Even if the acceleration of the preceding vehicle as it moves from a standstill is the same in two different situations, the target drive force given by Equation (1) depends on the vehicle separation at the time of starting, so the acceleration of the vehicle being controlled can greatly vary in the two situations.

When the initial vehicle separation is smaller than the target vehicle separation, the effect on the calculated target drive force of the term in Equation (1) proportional to (measured vehicle separation-target vehicle separation) is greater than the effect of the term proportional to the relative speed, so even though the preceding vehicle is starting, the vehicle being controlled does not start. When the preceding vehicle further advances and the vehicle separation increases, the vehicle being controlled begins to move, but by that time, the speed of the preceding vehicle is already high, so in a short time, the vehicle separation becomes large. Due to the large vehicle separation, the vehicle being controlled undergoes sudden acceleration. As a result, the driver of the vehicle initially sees the preceding vehicle pulling away from his vehicle, so he has the subjective feeling that the following control apparatus has not performed properly. When his vehicle subsequently undergoes a sudden acceleration, the driver not only is feeling an extremely unpleasant physical sensation, but he may experience a fear that his vehicle is about to collide with the preceding vehicle. Furthermore, due to the sudden increase in vehicle separation at the time of starting of the preceding vehicle, the vehicle separation may become too large for the distance sensor of the following control apparatus to measure the vehicle separation, in which case following control becomes impossible.

It is possible to increase the responsiveness of the following control apparatus at the time of starting by increasing the gain of the apparatus, but this results in hunting (i.e., the periodic variation in speed of the motor with respect to current) of the vehicle when it reaches a normal driving speed, and the ride becomes uncomfortable for the passengers of the vehicle.

Thus, a conventional following control apparatus can not be utilized except when the vehicle being controlled and the preceding vehicle are moving at a nearly constant speed. When a vehicle with a conventional following control apparatus is moving in stop and go traffic, the following control apparatus can not be turned on until the vehicle reaches a fairly constant speed, so the driver must continually restart the apparatus after each time the vehicle stops in traffic. When frequent starts and stops are performed, the need for the driver to repeatedly restart the following control apparatus is troublesome, so the purpose of the apparatus, which is to decrease driver fatigue, is not achieved. Furthermore, if the driver inadvertently forgets to restart the following control apparatus but is under the impression that the apparatus is actually turned on, the driver is likely to pay inadequate attention to the separation from the preceding vehicle, and a collision with the preceding vehicle can easily result.

SUMMARY OF THE INVENTION

Accordingly, it is an object of the present invention to provide a following control apparatus that can control a vehicle in a reliable manner even in stop and go traffic.

It is another object of the present invention to provide a following control apparatus that provides a comfortable ride for the passengers of a vehicle.

It is yet another object of the present invention to provide a following control apparatus that makes it less tiresome to drive in stop and go traffic.

It is a further object of the present invention to provide a following control apparatus that is not only safe but does not impart a fear of collision to the driver of a vehicle.

A following control apparatus according to the present invention controls the output of an engine and the brakes of an automotive vehicle so as to maintain a target vehicle separation from a preceding vehicle. A control unit calculates a target drive force for the vehicle and controls the brakes and the throttle valve of the engine so as to achieve the target drive force.

In one form of the invention, the target drive force when the vehicle is starting from a standstill is calculated based on the relative speed of the vehicle and the preceding vehicle and the difference between the measured vehicle separation and the target vehicle separation when the measured vehicle separation is at least the target vehicle separation, but is calculated based on the relative speed of the vehicle independently of the vehicle separation when the measured vehicle separation is less than the target vehicle separation.

In another form of the invention, the target drive force when the vehicle is starting from a standstill is calculated based on the relative speed of the vehicle and the preceding vehicle, and the difference between the measured vehicle separation and the target vehicle separation. The control gain used in the calculation is such that the target drive force is greater when the vehicle speed is less than a predetermined value than when the vehicle speed is greater than the predetermined value.

As a result, a vehicle equipped with a following control apparatus according to the present invention accelerates quickly and smoothly from a standstill without a large increase in the separation from the preceding vehicle. The ride is made more comfortable, and because there are no sudden accelerations, the driver of the vehicle does not experience a fear of collision with a preceding vehicle.

DESCRIPTION OF THE PREFERRED EMBODIMENTS

Figure 1:
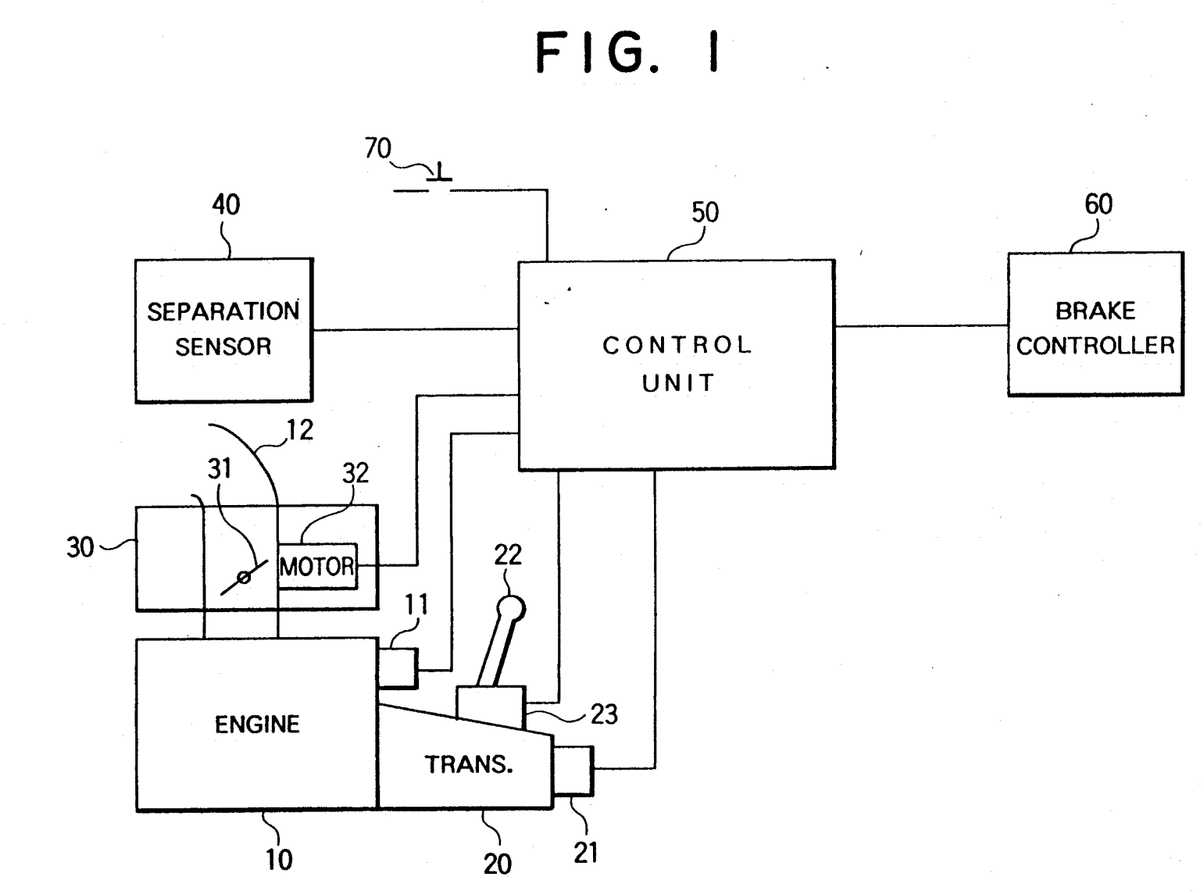
FIG. 1 is a block diagram of an embodiment of a following control apparatus according to the present invention.

A number of preferred embodiments of a following control apparatus according to the present invention will now be described while referring to the accompanying drawings. FIG. 1 is a block diagram of a first embodiment as applied to the engine 10 of an unillustrated vehicle. The engine 10 is connected to a transmission 20 that transmits the engine output to the unillustrated drive wheels of the vehicle. The transmission 20 is not limited to a specific type. For example, it can be an automatic transmission equipped with a hydraulic linkage in the form of a torque converter. Alternatively, it can be a combination of a stepless transmission and a clutch. A vehicle speed sensor 21 senses the rotational speed of the output shaft of the transmission 20 and provides a corresponding output signal to a control unit 50. The driver of the vehicle can adjust the operating setting of the transmission 20 by a shift lever 22. The shift lever 22 can be adjusted manually, or it can be adjusted automatically by a shift lever drive mechanism 23 that operates in response to signals from the control unit 50.

The rotational speed of the engine 10 is sensed by an engine speed sensor 11 that provides a corresponding output signal to the control unit 50. The output of the engine 10 is controlled by a throttle valve control mechanism 30 disposed along the air intake pathway of the engine. It includes a pivotally mounted throttle valve 31 mounted, for example, in an intake manifold 12 of the engine 10, and a motor 32 that opens and closes the throttle valve 31 in response to control signals from the control unit 50.

The separation between the vehicle and a preceding vehicle is measured by a vehicle separation sensor 40 that provides an output signal indicating the separation to the control unit 50. Any type of separation sensor can be employed. One type of separation sensor that can be employed has a near infrared LED that is mounted on the front of the vehicle and that is driven in pulses to illuminate the preceding vehicle. An optical position detector separated by a prescribed amount from the LED receives light from the LED after it is reflected from the preceding vehicle. Based on the position at which the reflected light is detected, the separation from the preceding vehicle is calculated by triangulation. To reduce the effect of errors in the measurements, the separation sensor 40 can average a plurality of measurements. For example, in the present embodiment, the LED is driven every 10 ms and the vehicle separation is measured every 10 ms. The results of 5 measurements are averaged, and every 50 ms, a signal indicative of the average is output to the control unit 50.

The control unit 50 preferably comprises a microcomputer having a CPU and various memories.

The hydraulic pressure of the brakes of the vehicle is controlled by a brake controller 60 that is in turn controlled by the control unit 50. The brake controller 60 controls the brake hydraulic pressure using the engine vacuum or by operating a hydraulic pump. The brake controller 60 is connected in parallel with the main brake system of the vehicle which is operated by an unillustrated brake pedal. When the driver depresses the brake pedal, whichever hydraulic pressure is higher (the one generated by the brake controller 60 or the one generated by the depression of the brake pedal) because the brake hydraulic pressure and activates the brakes.

The driver of the vehicle initiates following operation by depression of a start switch 70 connected to the control unit 50. The start switch 70 is illustrated as a switch that the driver depresses a single time to begin the following operation, but the form of the switch is not important, and it could be a mechanical switch such as a single-throw switch that the driver moves between an open and a closed position.

During normal following operation (i.e., following operation subsequent to starting), the control unit 50 calculates a target drive force (which be referred to as A) necessary to bring the actual vehicle separation between the vehicle being controlled and a preceding vehicle on the same road towards a predetermined target vehicle separation stored in the memory of the control unit 50. The target drive force A is calculated using Equation (1) described above based on the actual vehicle separation measured by the vehicle separation sensor 40, the target vehicle separation, and the relative speed of the vehicle and the preceding vehicle. In Equation (1), the predetermined constants $K_1$ and $K_2$ are previously selected based on the characteristics of the vehicle and the desired responsiveness of the vehicle. The target drive force A given by Equation (1) is then converted into a target engine output, and the target engine output is converted into a target throttle opening. The throttle valve 31 is then controlled by the throttle valve controller 30 to attain the target throttle opening.

The relative speed in Equation (1) is calculated by the control unit 50 from the rate of change of the vehicle separation measured by the vehicle separation sensor 40. In the case of a manual transmission, the target drive force A calculated from Equation (1) can be converted into a target engine output by dividing the target drive force A by the gear ratio of the transmission. In the case of an automatic transmission, the target engine output is found by dividing the target drive force A by both the gear ratio of the transmission and the torque ratio of the torque converter. The torque ratio is the ratio of the rotational speed of the input shaft to the rotational speed of the output shaft of the torque converter. The input shaft rotational speed is the engine rotational speed measured by the engine speed sensor 11, and the output shaft rotational speed can be found from the speed of the vehicle indicated by the output of the vehicle speed sensor 21. The engine output is determined by the engine rotational speed and the throttle valve opening. Therefore, if one knows the target engine output and the engine rotational speed, one can solve for the target throttle valve opening. In the present embodiment, the target throttle opening is previously stored in a memory of the control unit 50 in the form of a memory map giving the target throttle opening as a function of the target engine output and the engine rotational speed, and the control unit 50 determines the target throttle opening by referring to the map using the engine rotational speed and the target engine output as input variables.

When the preceding vehicle decelerates and the target vehicle separation can not be maintained merely by decreasing the engine output, i.e., when the target drive force A calculated by Equation (1) is a large negative value, the brake controller 60 is operated by the control unit 50 to generate a brake hydraulic pressure proportional to the absolute value of the target drive force A. As a result, the brakes are applied, causing the vehicle to decelerate and maintaining the target vehicle separation. When the preceding vehicle stops, the control unit 50 minimizes the engine output by closing the throttle valve 31 and it operates the brake controller 60 to apply the brakes and completely stop the vehicle.

The starting of the preceding vehicle from a standstill is detected by the control unit 50 when there is a change in the measured vehicle separation. When the control unit 50 determines that the vehicle separation has reached a prescribed value, the brakes are released and the vehicle is started from a standstill. If the measured vehicle separation at this time is greater than or equal to the target vehicle separation, the control unit 50 calculates the target drive force A for the vehicle using Equation (1). However, if the measured vehicle separation is less than the target vehicle separation, the control unit 50 calculates the target drive force (which will be referred to as B) using the following formula based only the relative speed of the vehicle and the preceding vehicle:

$$\text{Target Drive Force } B = K_3 \times \text{Relative Speed} \qquad (2)$$

wherein $K_3$ is a predetermined constant. The control unit 50 then converts the target drive force B into a target engine output in the same manner as for the target drive force A calculated by Equation (1), a target throttle opening is calculated from the target engine output and the engine rotational speed using the above-described memory map, and the throttle valve 31 is controlled to attain the target throttle opening.

When the measured vehicle separation once again becomes greater than or equal to the target vehicle separation, the control unit 50 switches back to Equation (1) to calculate the target drive force and controls the throttle valve 31 or the brake controller 60 based on the result of calculation.

Figure 2:
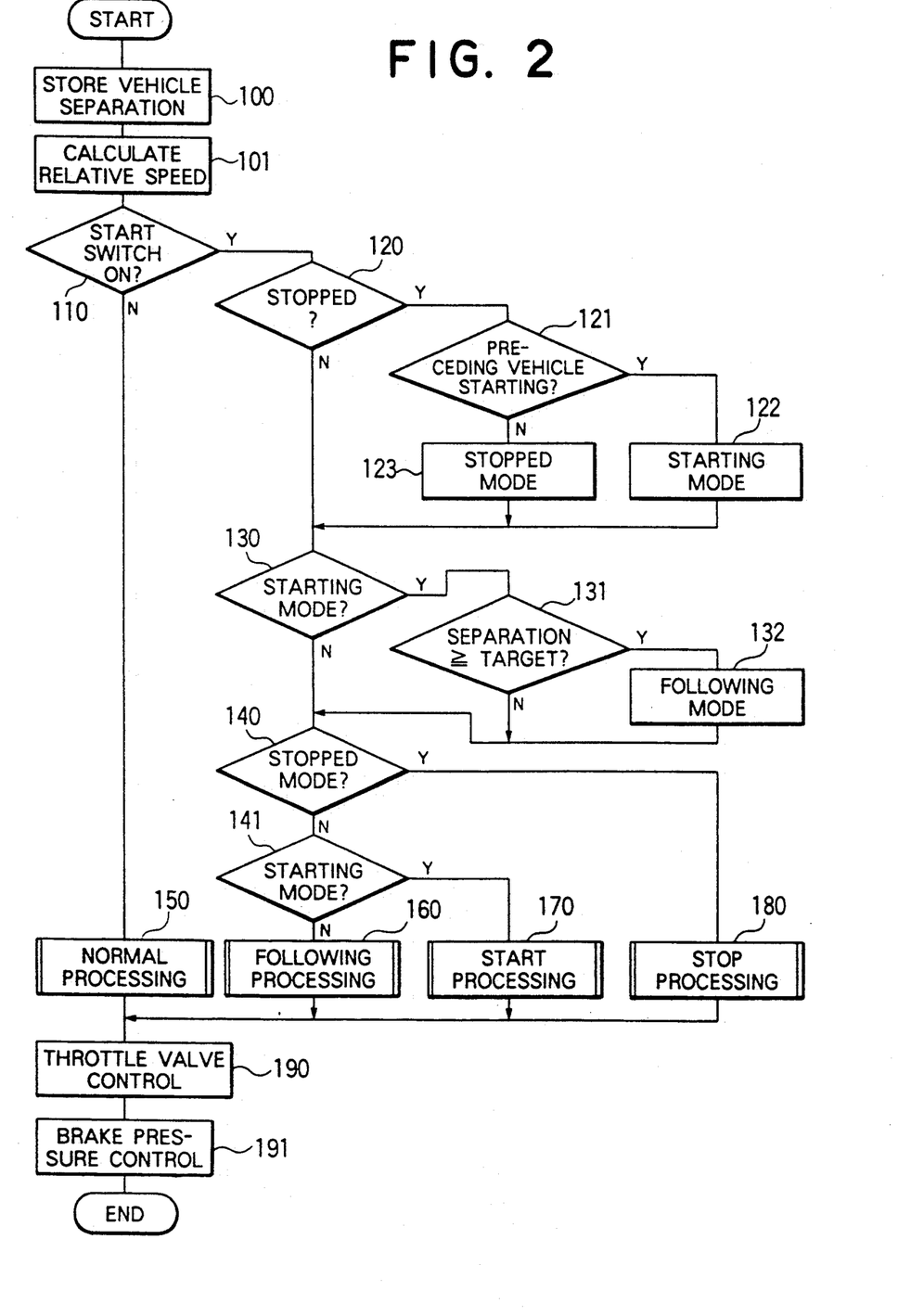
FIG. 2 is a flow chart of the operation of the embodiment of FIG. 1.

The operation of the embodiment of FIG. 1 will be described in greater detail using the flow charts of FIGS. 2-6. FIG. 2 illustrates the overall flow of calculations performed by the control unit 50. This series of calculations is performed each time the vehicle separation sensor 40 provides the control unit 50 with a signal indicating the vehicle separation, such as every 50 ms. In Step 100, the most recently measured vehicle separation from the vehicle separation sensor 40 is stored in a memory of the control unit 50. The memory stores a plurality of the measurements, such as the last 10 measurements. In Step 101, the control unit 50 calculates the relative speed of the vehicle and the preceding vehicle. This calculation is performed by calculating the difference between the most recent value of the vehicle separation and the previous value of the vehicle separation and then dividing the difference by the length of time (50 ms) between measurements. In Step 110, it is determined whether following operation is being performed by checking whether the start switch 70 has been depressed. If the start switch 70 has not been depressed, then in Step 150 normal processing is performed, in which the target throttle opening and brake pressure for normal vehicle operation without performing following control are calculated.

When it is determined in Step 110 that the start switch 70 has been depressed, then in Step 120, it is determined whether the vehicle is stopped. The vehicle is determined to be stopped if the vehicle speed indicated by the vehicle speed sensor 21 is 0. If the vehicle is stopped, then in Step 121, it is determined whether the preceding vehicle has started. This determination is made by comparing the present vehicle separation and the vehicle separation four measurements earlier (200 ms earlier). If the vehicle separation has increased by at least a prescribed amount (such as 10 cm), it is determined that the preceding vehicle has started, so in Step 122 the operating mode of the vehicle is made starting mode. In Step 121, if the vehicle separation has not changed by at least the prescribed amount, in Step 123, the operating mode is made the stopped mode.

In Step 130, it is determined whether the operating mode is the starting mode. If it is, then in Step 131, it is determined whether the measured vehicle separation is at least the target vehicle separation. If it is, then in Step 132, the operating mode is made the following mode.

In Step 140, it is determined if the operating mode is the stopped mode. If it is, then in Step 180, stop processing is performed to calculate a target throttle opening and a target brake pressure for stopping the vehicle. If the operating mode is not the stopped mode in Step 140, then in Step 141, it is determined if the operating mode is the starting mode. If it is, then in Step 170, start processing is performed to calculate the target throttle opening and target brake pressure for starting the vehicle from a standstill. If the operating mode is not the starting mode in Step 141, then it is determined that the vehicle is performing normal following, so in Step 160, following processing is performed and the target throttle opening and target brake pressure for following operation are calculated. After any one of Steps 150, 160, 170, or 180 is performed, in Steps 190 and 191, the throttle valve opening and the brake pressure are set to the target values calculated in the processing steps.

Figure 3:
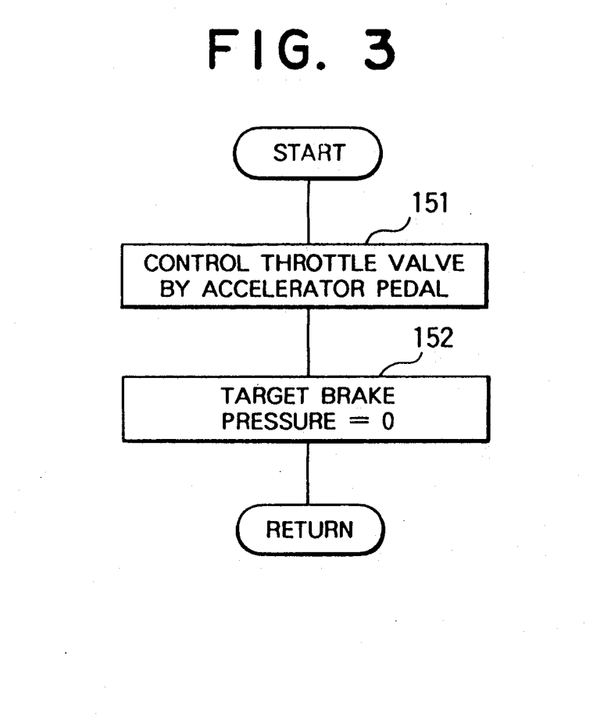
FIG. 3 is a flow chart of the normal processing of Step 150 of FIG. 2.

FIG. 3 is a flow chart showing the start processing of Step 150 of FIG. 2 in detail. In Step 151, the target throttle opening is set to a value proportional to the amount by which the driver has depressed the accelerator pedal of the vehicle. In Step 152, the target brake pressure is set to 0 so that hydraulic pressure will be applied to the brakes only when the driver depresses the brake pedal. Accordingly, during normal driving without performing following control, the operation of the throttle valve and the brakes is controlled by the driver of the vehicle, and from the standpoint of the driver, the operation of the vehicle is identical to the operation of a conventional vehicle.

Figure 4:
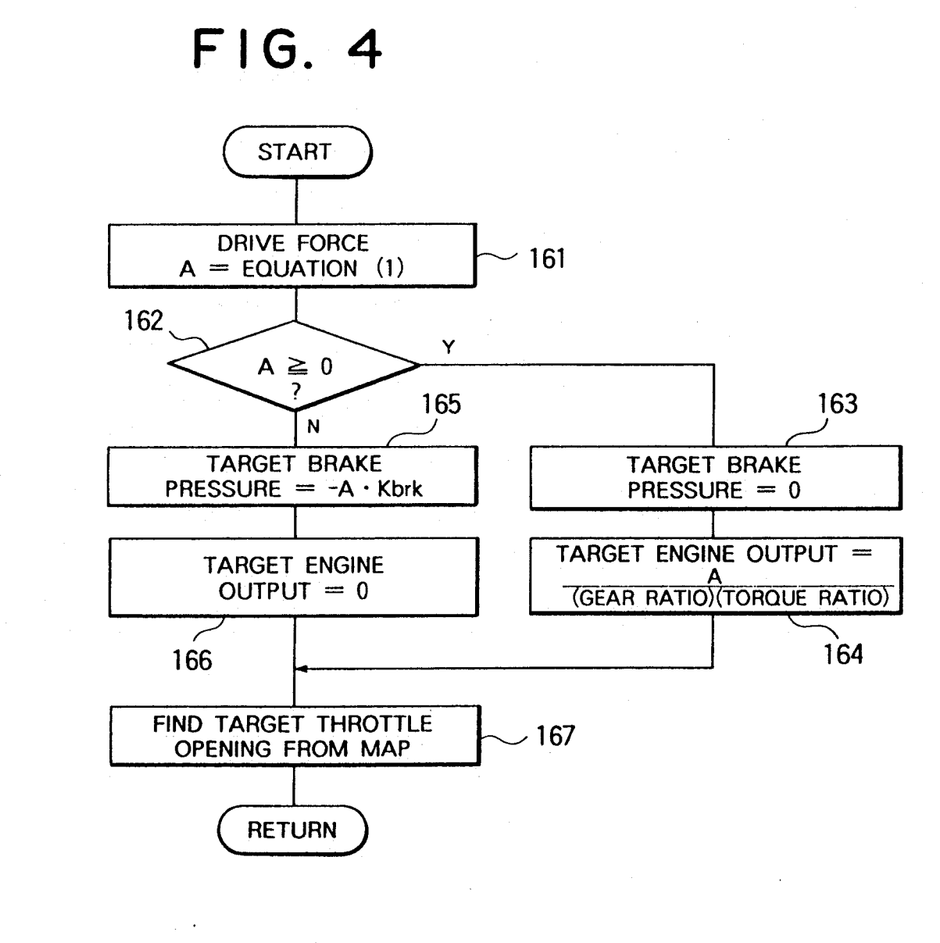
FIG. 4 is a flow chart of the following processing of Step 160 of FIG. 2.

FIG. 4 is a flow chart showing the following processing of Step 160 of FIG. 2 in detail. In Step 161, the target drive force A is calculated from Equation (1) using the target vehicle separation, the measured vehicle separation, and the relative speed calculated in Step 101. In Step 162, the magnitude of the target drive force A is evaluated. If the target drive force A is greater than or equal to 0, then in Step 163, the target brake pressure is set to 0, and in Step 164, the target drive force is divided by the gear ratio and the torque ratio to give the target engine output. In Step 162, if it is determined that the target drive force is negative, in Step 165 the target brake pressure is calculated by multiplying the absolute value of the target drive force ($-A$) by a predetermined constant $K_{brk}$, and in Step 166 the target engine output is set to 0. In Step 167, the target throttle opening is found from the memory map in the control unit using the target engine output found in Step 164 or 166 and the engine rotational speed as input variables.

Figure 5:
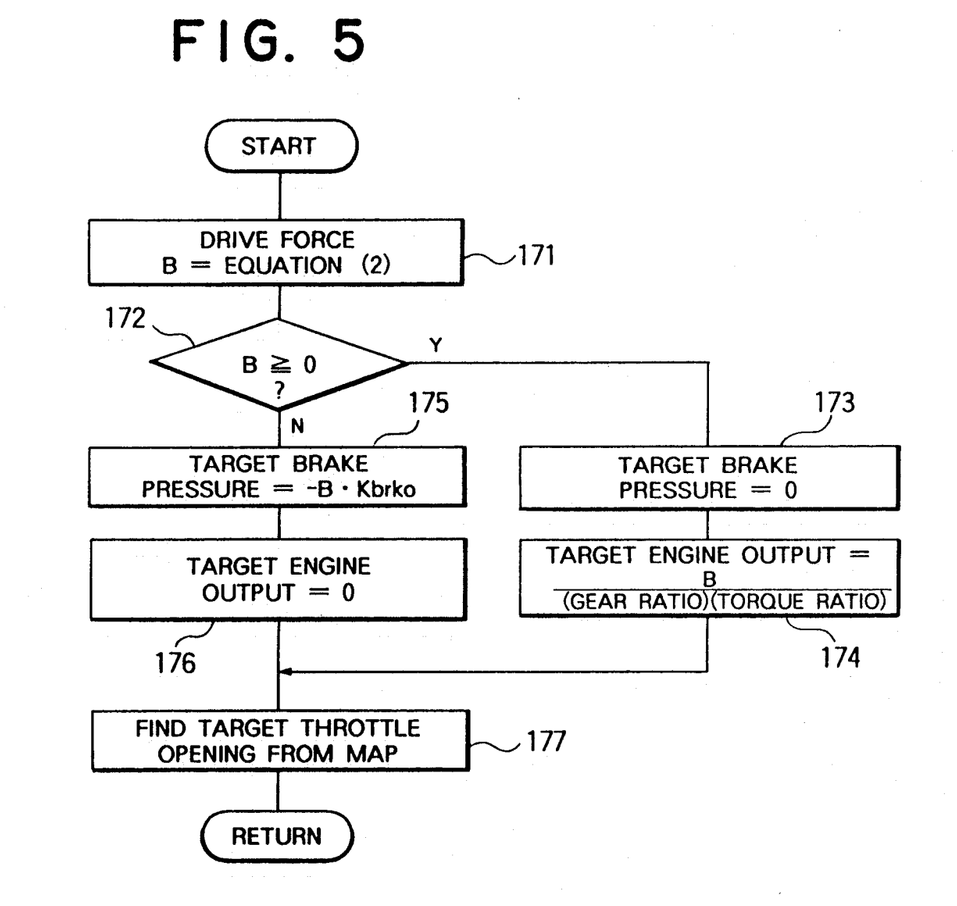
FIG. 5 is a flow chart of the start processing of Step 170 of FIG. 2.

FIG. 5 is a flow chart showing the start processing of Step 170 of FIG. 2 in detail. In Step 171, the target drive force B for starting the vehicle from a standstill is calculated as a function of the relative speed found in Step 101 using Equation (2). In Step 172, the magnitude of the target drive force B is evaluated. If the target drive force B is greater than or equal to 0, then in Step 173, the target brake pressure is set to 0, and in Step 174, the target drive force B is divided by the gear ratio and the torque ratio to give the target engine output. If the target drive force B is Step 172 is less than 0, then in Step 175 the absolute value of the target drive force ($-B$) is multiplied by a predetermined constant $K_{brk0}$ to give the target brake pressure, and in Step 176, the target engine output is set equal to 0. In Step 177, the target throttle opening is found from the memory map in the control unit 50 using the target engine output found in Step 174 or 176 and the engine rotational speed as input variables.

Figure 6:
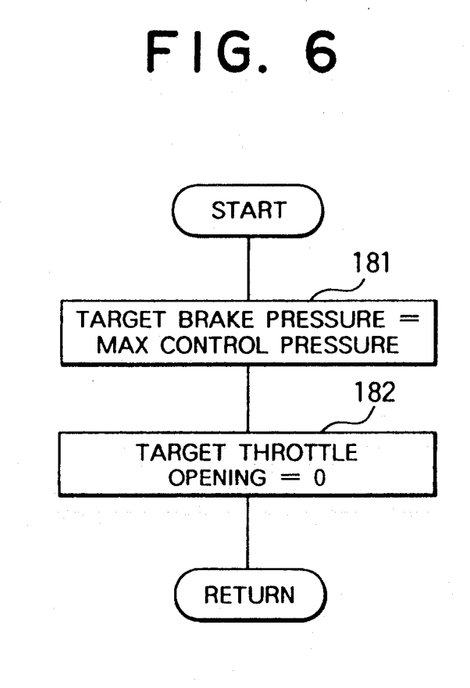
FIG. 6 is a flow chart of the stop processing of Step 180 of FIG. 2.

FIG. 6 is a flow chart showing the stop processing of Step 180 of FIG. 2 in detail. In Step 181, the target brake pressure is set to the maximum brake pressure that can be achieved by the brake controller 60, and in Step 182, the target throttle opening is set to 0 to minimize the engine output.

Figure 7:
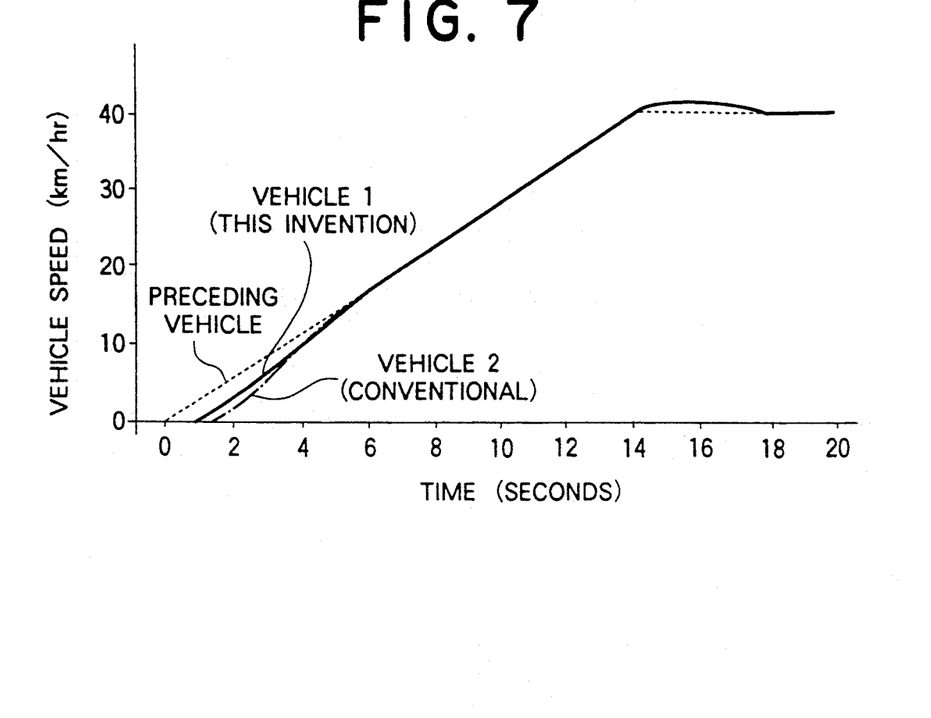
FIG. 7 is a graph of the vehicle speed as a function of time for a vehicle equipped with the embodiment of FIG. 1.
Figure 8:
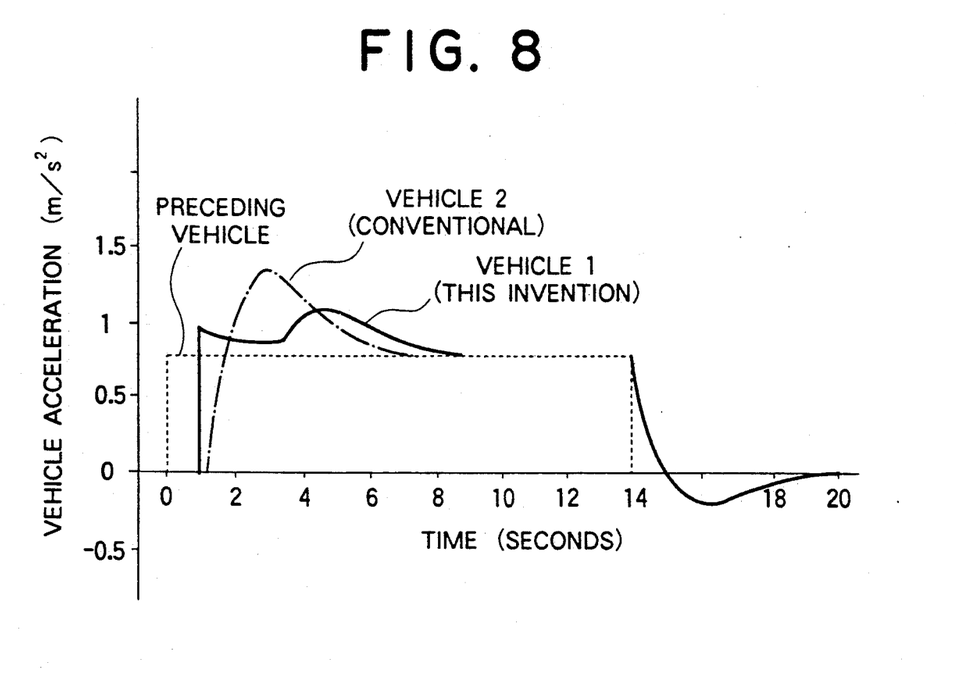
FIG. 8 is a graph of the vehicle acceleration as a function of time for a vehicle equipped with the embodiment of FIG. 1.
Figure 9:
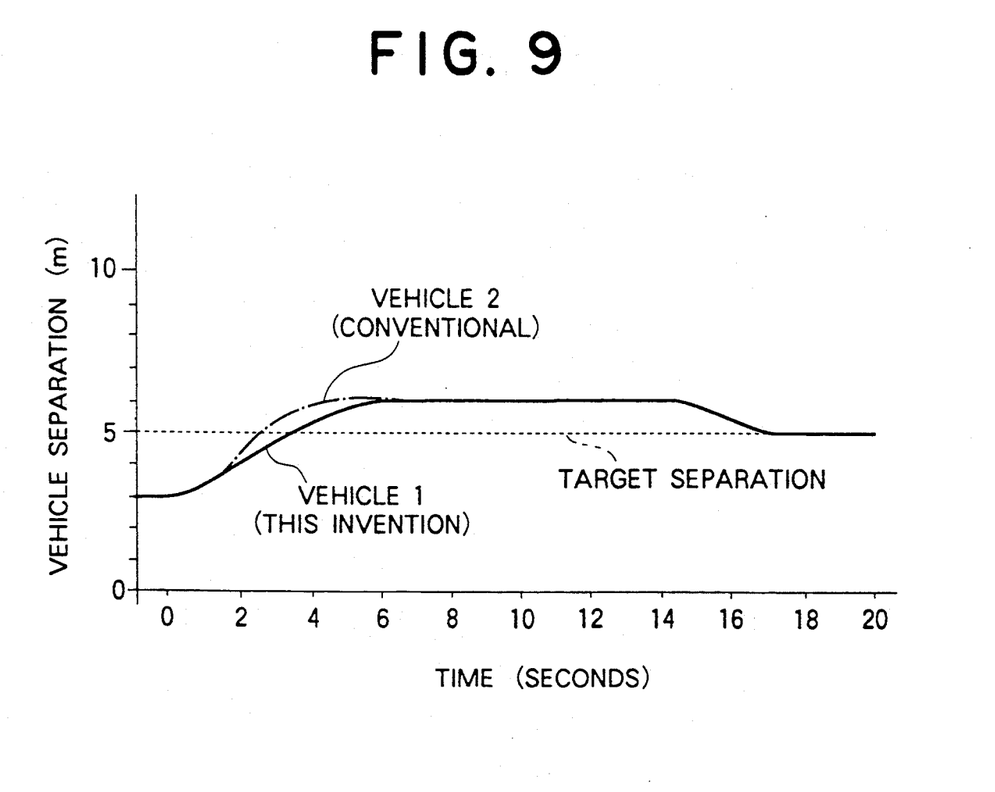
FIG. 9 is a graph of the vehicle separation as a function of time for a vehicle equipped with the embodiment of FIG. 1.

FIGS. 7 through 9 show the vehicle speed (FIG. 7), the acceleration (FIG. 8) and the vehicle separation (FIG. 9) of a vehicle equipped with a following control apparatus according to the present invention (Vehicle 1) and of a vehicle equipped with a conventional following control apparatus (Vehicle 2) when performing following of a preceding vehicle. In each figure, the solid line shows the characteristics of Vehicle 1, the long and short dashed line shows the characteristics of Vehicle 2, and the short dashed line shows the value for a preceding vehicle that was being following or else a target value. The operating conditions were a target vehicle separation of 5 meters and an initial vehicle separation from the preceding vehicle of 3 meters at the time of starting from a standstill. The preceding vehicle accelerated from 0 km/hour to 40 km/hour in 14 seconds at a constant acceleration. This is considered a typical rate of acceleration for a passenger vehicle.

As shown in FIG. 7, the speed of Vehicle 1 equipped with an apparatus according to the present invention began to increase nearly linearly approximately 1 second after the start of the preceding vehicle. In contrast, the speed of Vehicle 2 equipped with a conventional apparatus began to increase approximately 1.2 seconds after the start of the preceding vehicle. The speed of Vehicle 2 initially increased slowly and then abruptly increased to a higher level than for Vehicle 1.

As shown in FIG. 8, the acceleration of Vehicle 1 equipped with the present invention was somewhat higher than the acceleration of the preceding vehicle beginning approximately 1 second after the start of the preceding vehicle. Subsequently, Vehicle 1 followed the preceding vehicle without a large difference in the acceleration of Vehicle 1 and the preceding vehicle. The acceleration of Vehicle 2 equipped with a conventional apparatus increased more slowly than the acceleration of the preceding vehicle beginning approximately 1.2 seconds after the start of the preceding vehicle, and approximately 3 seconds after the start of the preceding vehicle, the acceleration of Vehicle 2 reached a maximum value that exceeded the maximum acceleration of Vehicle 1. It is clear that the acceleration of the Vehicle 1 equipped with the present invention was much closer to the acceleration of the preceding vehicle than was the acceleration of Vehicle 2. When the acceleration greatly increases after starting as in the case of Vehicle 2, the driver often experiences a fear of collision with the preceding vehicle. In a vehicle equipped with the present invention, the difference in acceleration between the vehicle and the preceding vehicle is small, so no fear of collision is imparted to the driver.

As shown in FIG. 9, the vehicle separation for Vehicle 1 equipped with the present invention was more gradual than the vehicle separation of Vehicle 2 equipped with a conventional apparatus and the maximum value of the vehicle separation was lower. Therefore, the driver of a vehicle equipped with the present invention does not have the feeling that the preceding vehicle is immediately pulling far ahead of him, and he is given the subjective feeling that following has been successfully performed by his vehicle.

The operation of a vehicle equipped with a following control apparatus according to the present invention when frequent starting and stopping is performed is as follows. When the vehicle is stopped, the stop processing of Step 180 of FIG. 2 is performed. When the preceding vehicle starts, if the vehicle separation is smaller than the target separation, starting is performed by the start processing of Step 170, and the acceleration at starting is set by the target drive force B given by Equation (2). As a result, the vehicle speed increases uniformly, and the vehicle can begin following the preceding vehicle without a sudden increase in vehicle separation. When the vehicle separation reaches the target vehicle separation, the target drive force A is calculated by Equation (1). If the preceding vehicle stops, the brakes are automatically applied as part of the following processing of Step 160, so the vehicle is stopped. When the preceding vehicle again starts, the start processing of Step 170 is repeated. Therefore, following operation can be successfully performed even under driving conditions with repeated starts and stops such as occur on typical city streets. In the starting mode, even if the vehicle separation is smaller than the target vehicle separation, such as when the preceding vehicle decelerates and stops, the brakes are automatically applied as part of the start processing of Step 170 and the vehicle is stopped, so there is no danger of a collision taking place.

Since a following control apparatus according to the present invention can perform following control even when a vehicle is starting from a standstill, it is not necessary for the driver of the vehicle to restart the apparatus each time his vehicle reaches a predetermined speed, as is the case with some conventional following control apparatuses. Therefore, the fatigue of driving is greatly decreased. Furthermore, since the driver needs to press the start switch 70 a single time instead of repeatedly to initiate following control, the chances of the driver inadvertently forgetting to press the start switch and failing to pay adequate attention to the vehicle separation under the mistake impression that the following control apparatus is turned on are greatly reduced, and the changes of an accident due to such inadvertence are correspondingly decreased.

The constant $K_{brk0}$ used for calculating the target brake pressure during the starting mode can be made larger than the constant $K_{brk}$ used for calculating the target brake pressure during the following mode to ensure that the vehicle is stopped when the preceding vehicle performs extreme movements such as sudden braking immediately after starting. The speed during starting mode is low (such as below 5 km/hour), so even application of a strong hydraulic pressure to the brakes does not impart an unpleasant sensation to the driver.

In the above-described embodiment, the target throttle opening is calculated by first calculating a drive force, then calculating a target engine output corresponding to the drive force, and then determining a corresponding target throttle opening from a memory map. However, the exact method of determining the target throttle opening is not important. For example, it is possible to store the target throttle opening in a memory map as a function of the vehicle separation, the relative speed, and the engine rotational speed and to determine the target throttle opening in a single step by referring to the memory map.

In the preceding embodiment, at the time of starting, the target drive force is calculated as a function of only the relative speed of the vehicle being controlled and the preceding vehicle. In a second embodiment of the present invention, the target drive force at the time of starting is calculated as a function of both the vehicle separation and the relative speed, but the constants in the equation for calculating the target drive force are chosen such that the target drive force at the time of starting is larger than the target drive force during normal following operation for any given vehicle separation and relative speed.

Figure 10:
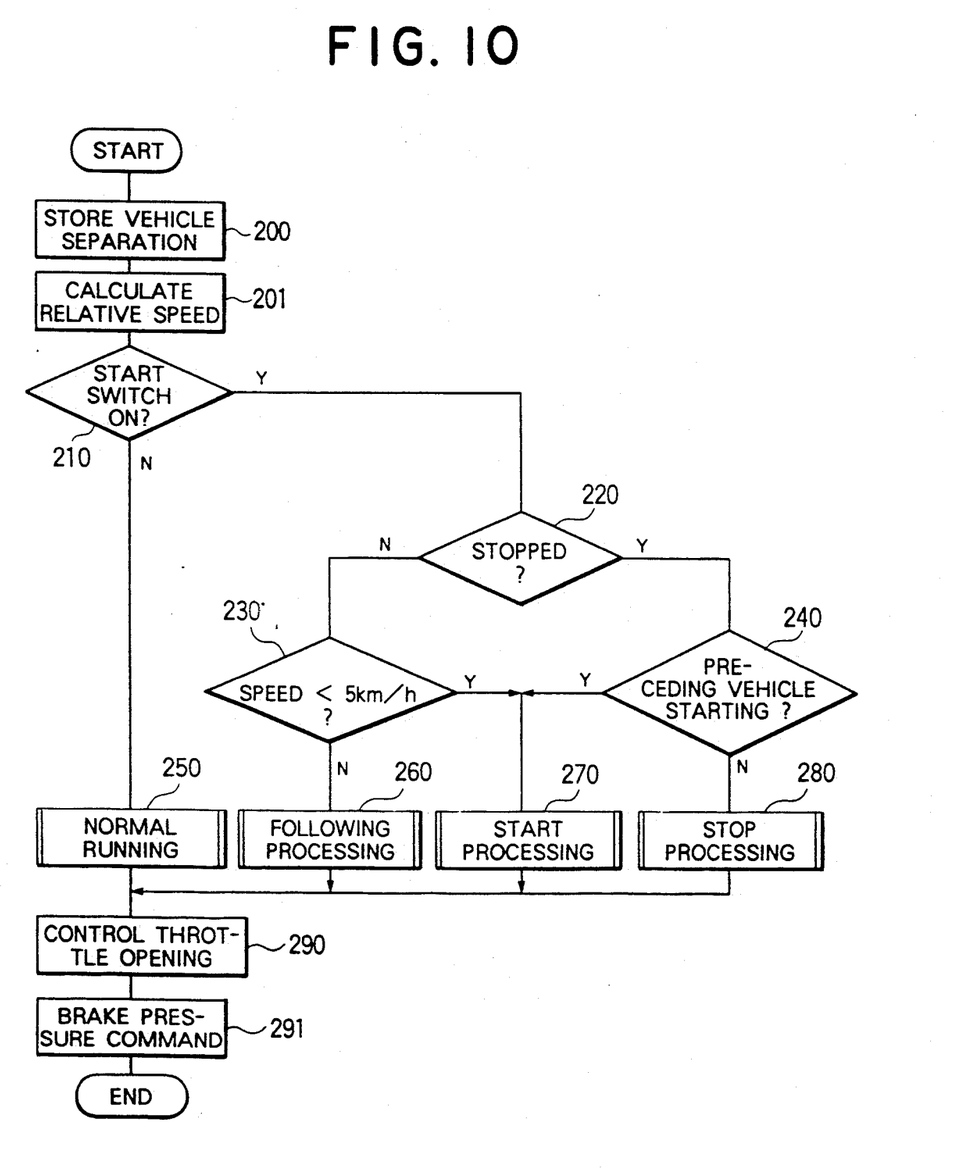
FIG. 10 is a flow chart of the operation of a second embodiment of the present invention.

The second embodiment has the same structure as the embodiment of FIG. 1 and differs from that embodiment only with respect to the programs executed by the control unit 50 for performing following control. The operation of this embodiment will be described using the flow charts of FIGS. 10-14. FIG. 10 illustrates the overall flow of calculations performed by the control unit 50. This series of calculations is performed each time the vehicle separation sensor 40 provides the control unit 50 with a signal indicating the vehicle separation, such as every 50 ms. In Step 200, the most recently measured vehicle separation from the vehicle separation sensor 40 is stored in a memory of the control unit 50. The memory stores a plurality of the measurements, such as the last 10 measurements. In Step 201, the control unit 50 calculates the relative speed of the vehicle and the preceding vehicle in the same manner as in Step 101 of FIG. 2. In Step 210, it is determined whether following operation is being performed by checking whether the start switch 70 has been depressed. If the start switch 70 has not been depressed, then in Step 250 normal processing is performed and the target throttle opening and target brake pressure for normal vehicle operation without performing following control are calculated.

When it is determined in Step 210 that the start switch 70 has been depressed, then in Step 220, it is determined whether the vehicle is stopped. The vehicle is determined to be stopped if the vehicle speed indicated by the vehicle speed sensor 21 is 0. If the vehicle is stopped, then in Step 240, it is determined whether the preceding vehicle has started. This determination is made by comparing the present vehicle separation and the vehicle separation four measurements earlier (200 ms earlier). If the vehicle separation has increased by at least a prescribed amount (such as 10 cm), it is determined that the preceding vehicle has started, so in Step 270, start processing is performed. In Step 240, if the vehicle separation has not changed by at least the prescribed amount, then in Step 280 stop processing is performed and the target throttle opening and target brake pressure for stopping the vehicle are calculated.

In Step 220, if it is determined that the vehicle is not stopped, then in Step 230, the operating mode is determined by comparing the vehicle speed with a prescribed speed, such as 5 km/hour. If the vehicle speed is less than 5 km/hour, the operating mode is determined to be the starting mode, so in Step 270, start processing is performed. If the vehicle speed is greater than or equal to 5 km/hour, the operating mode is determined to be the following mode, so in Step 260, following processing is performed and the target throttle opening and target brake pressure for following operation are calculated.

After any one of Steps 250, 260, 270, or 280 is performed, in Steps 290 and 291, the throttle valve opening and the brake pressure are set to the target values calculated in the processing steps.

Figure 11:
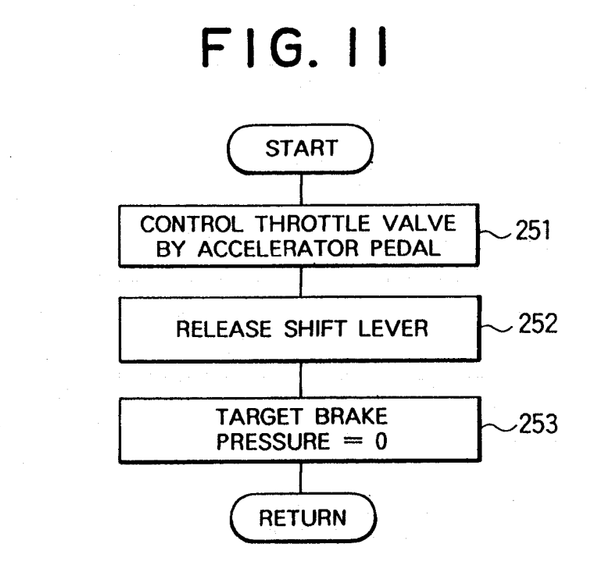
FIG. 11 is a flow chart of the normal processing of Step 250 of FIG. 10.

FIG. 11 is a flow chart showing the start processing of Step 250 of FIG. 10 in detail. In Step 251, the target throttle opening is set to a value proportional to the amount by which the driver has depressed the accelerator pedal of the vehicle. In Step 252, the shift lever drive mechanism 23 releases the shift lever 22 so that it can be freely operated by the driver of the vehicle. In Step 253, the target brake pressure is set to 0 so that hydraulic pressure will be applied to the brakes only when the driver depresses the brake pedal. Accordingly, during normal driving, the operation of the throttle valve, the transmission, and the brakes is controlled by the driver of the vehicle, and from the standpoint of the driver, the operation of the vehicle is identical to the operation of a conventional vehicle.

Figure 12:
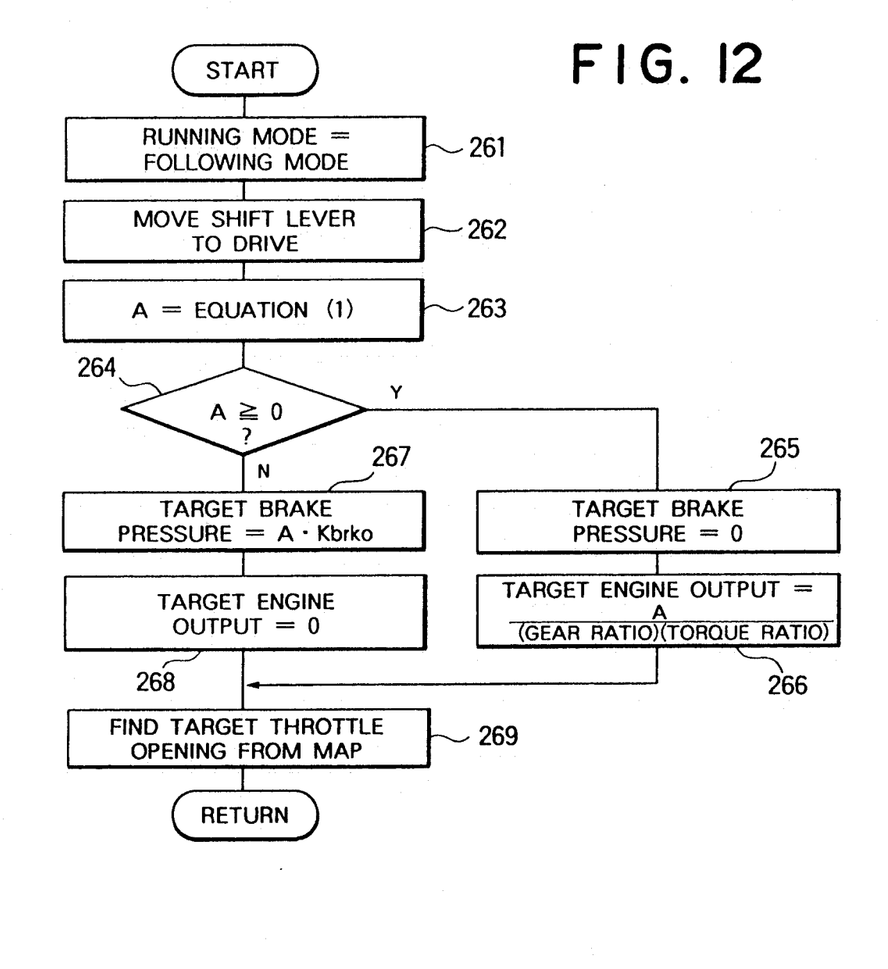
FIG. 12 is a flow chart of the following processing of Step 260 of FIG. 10.

FIG. 12 is a flow chart showing the following processing of Step 260 of FIG. 10 in detail. In Step 261, the operating mode is made the following mode. In Step 262, the shift lever drive mechanism 23 moves the shift lever 22 to the drive position. In Step 263, the target drive force A is calculated from Equation (1) using the target vehicle separation, the measured vehicle separation, and the relative speed calculated in Step 201. In Step 264, the magnitude of the target drive force A is evaluated. If the target drive force A is greater than or equal to 0, then in Step 265, the target brake pressure is set to 0, and in Step 266, the target drive force is divided by the gear ratio and the torque ratio to give the target engine output. In Step 264, if it is determined that the target drive force is negative, in Step 267 the target brake pressure is calculated by multiplying the absolute value of the target drive force ($-A$) by a predetermined constant $K_{brk}$, and in Step 268 the target engine output is set to 0. In Step 269, the target throttle opening is found from the memory map in the control unit 50 using the target engine output found in Step 266 or 268 and the engine rotational speed as input variables.

Figure 13:
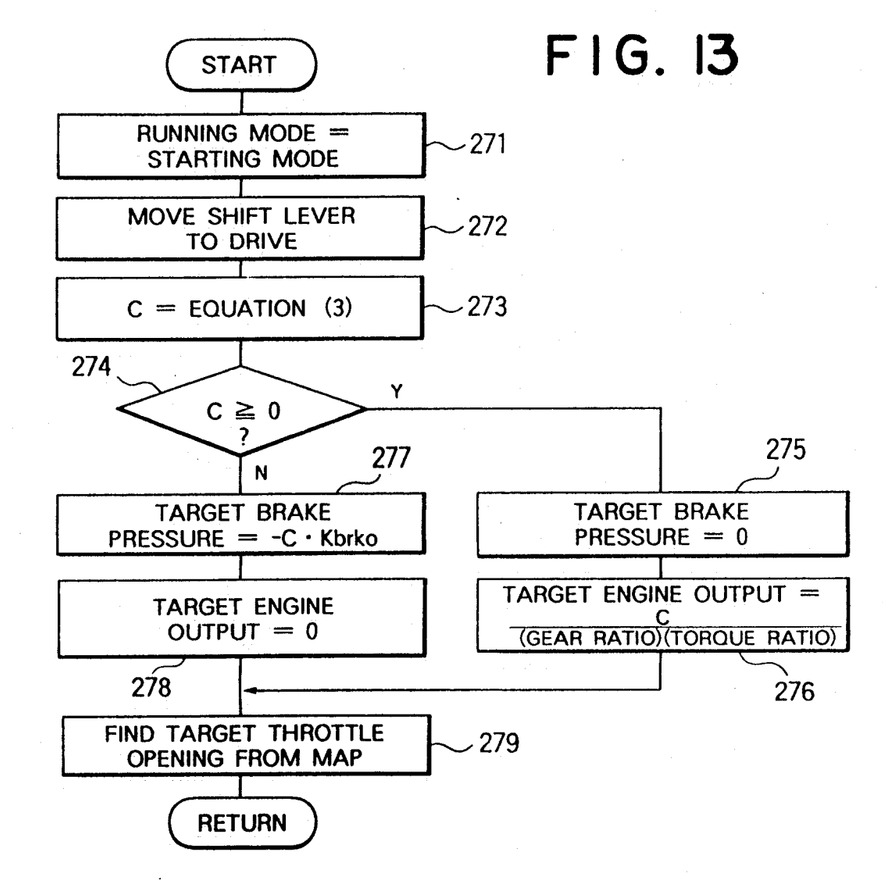
FIG. 13 is a flow chart of the start processing of Step 270 of FIG. 10.

FIG. 13 is a flow chart showing the start processing of Step 270 of FIG. 10 in detail. In Step 271, the operating mode is made the starting mode. In Step 272, the shift lever drive mechanism 23 moves the shift lever 22 to the drive position. In Step 273, the target drive force (which will be referred to as C) is calculated as a function of the measured vehicle separation, the target vehicle separation, and the relative speed using the following equation:

$$\text{Target Drive Force } C = K_4 \times (\text{measured vehicle separation} - \text{target vehicle separation}) + K_5 \times \text{relative speed} \quad (3)$$

wherein $K_4$ and $K_5$ are predetermined constants. $K_4$ and $K_5$ are chosen so that for the same values of (measured vehicle separation − target vehicle separation) and relative speed, the drive force given by Equation (3) will be larger than the drive force given by Equation (1).

In Step 274, the magnitude of the target drive force C is evaluated. If the target drive force C is greater than or equal to 0, then in Step 275, the target brake pressure is set to 0, and in Step 276, the target drive force C is divided by the gear ratio and the torque ratio to give the target engine output. If the target drive force C in Step 274 is less than 0, then in Step 277 the absolute value of the target drive force ($-C$) is multiplied by a predetermined constant $K_{brk0}$ to give the target brake pressure, and in Step 278, the target engine output is set equal to 0. In Step 279, the target throttle opening is found from the memory map in the control unit 50 using the target engine output found in Step 276 or 278 and the engine rotational speed as input variables.

Figure 14:
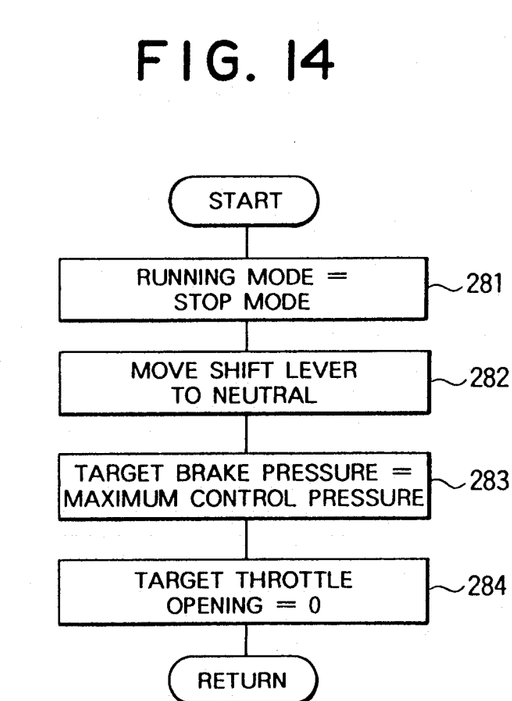
FIG. 14 is a flow chart of the stop processing of Step 280 of FIG. 10.

FIG. 14 is a flow chart showing the stop processing of Step 280 of FIG. 10 in detail. In Step 281, the operating mode is made the stopped mode. In Step 282, the shift lever drive mechanism 23 moves the shift lever 22 to the neutral position. In Step 283, the target brake pressure is set to the maximum brake pressure that can be achieved by the brake controller 60, and in Step 284, the target throttle opening is set to 0 to minimize the engine output.

The operation of a vehicle equipped with the second embodiment of a following control apparatus will be described for the situation when frequent starting and stopping are performed. When the vehicle being controlled and the preceding vehicle are both stopped, the stop processing of Step 280 of FIG. 10 is performed. When the preceding vehicle starts, the vehicle being controlled is started by the start processing of Step 270. The acceleration at starting is set by the target drive force given by Equation (3). This target drive force is larger than the target drive force given by Equation (1), so the vehicle speed quickly but smoothly increases without a sudden increase in the vehicle separation. When the vehicle speed reaches 5 km/hour, normal following operation is carried out by the following processing of Step 260. During normal following, the target drive force is calculated by Equation (1), which has a smaller control gain than Equation (3), so the vehicle separation does not fluctuate greatly (the vehicle does not perform hunting i.e., the periodic variation in speed of the motor with respect to current), and smooth following operation can be performed. When the preceding vehicle stops, the brakes are automatically applied as part of the following processing of Step 270, and when the vehicle stops, the shift lever 22 is moved to neutral. When the preceding vehicle again starts, the start processing of Step 270 is repeated. In this manner, smooth following can be performed even in stop and go traffic on city streets. Accordingly, this embodiment provides the same benefits as the preceding embodiment.

As in the preceding embodiment, the constant $K_{brk0}$ for controlling the brake pressure during starting mode can be made larger than the constant $K_{brk}$ for controlling the brake pressure during following mode.

In the embodiment of FIGS. 10-14, the transmission 20 is controlled by the control unit 50 as part of following control. This feature can also be applied to the embodiment of FIG. 1. Alternatively, if it is not desired to control the transmission operating range, the shift lever drive mechanism 23 can be omitted.

In the previous embodiments, the target vehicle separation used to calculate the vehicle target drive force in Equations (1) and (3) is a constant value. In a third embodiment of the present invention, the target vehicle separation during starting mode is varied. If the measured vehicle separation at the time of starting is greater than or equal to a predetermined value, the predetermined value is used as the target vehicle separation. However, if the measured vehicle separation during starting is less than the predetermined value, the measured vehicle separation is used as the target vehicle separation until the measured vehicle separation reaches the predetermined value. The structure of this third embodiment is the same as that of the embodiment of FIG. 1 and it differs only with respect to the programs executed by the control unit 50 for performing following control.

Figure 15:
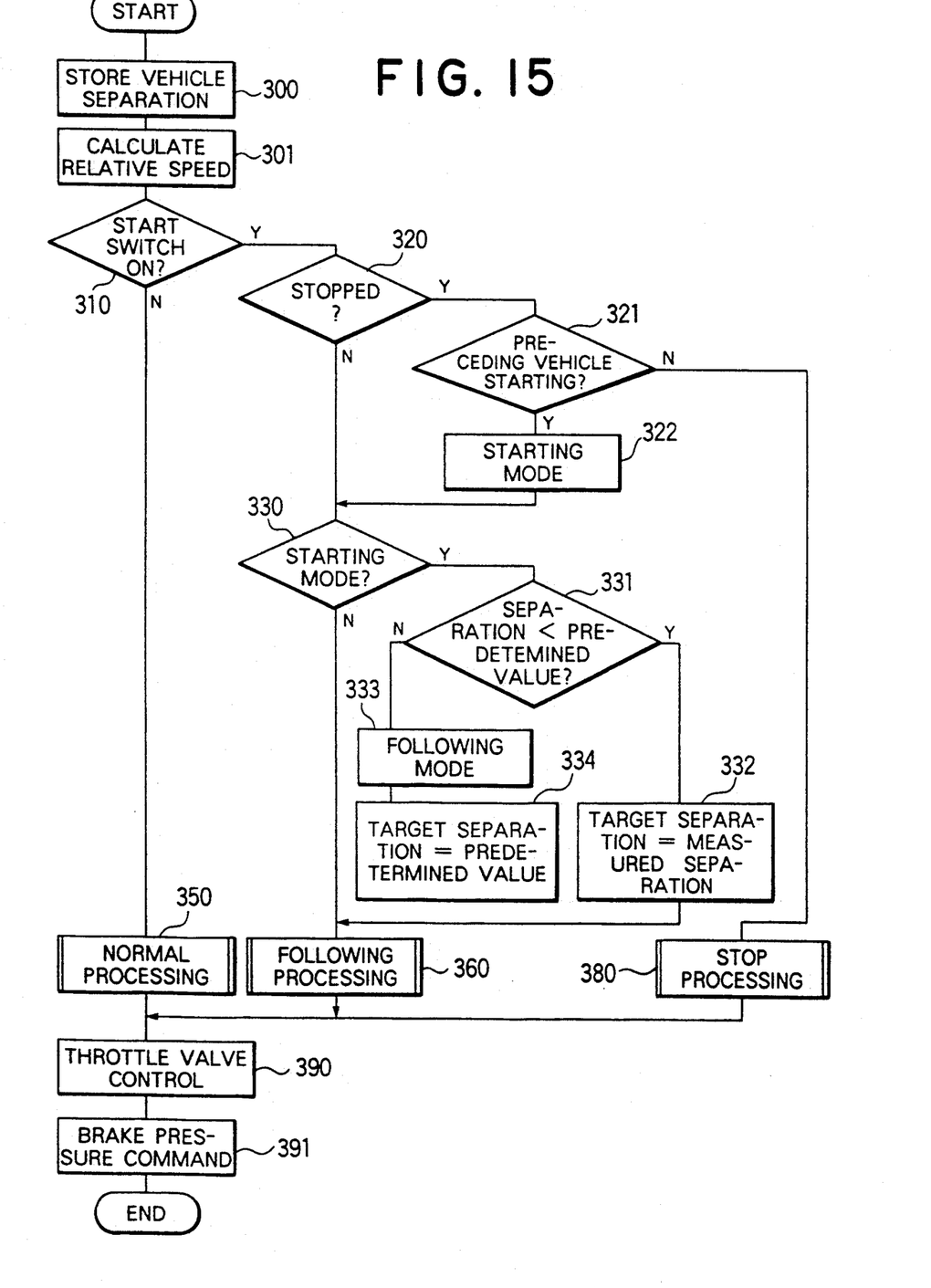
FIG. 15 is a flow chart of the operation of a third embodiment of the present invention.

FIG. 15 illustrates the overall flow of calculations performed by the control unit 50 in this embodiment. This series of calculations is performed each time the vehicle separation sensor 40 provides the control unit 50 with a signal indicating the vehicle separation, such as ever 50 ms. In Step 300, the most recently measured vehicle separation from the vehicle separation sensor 40 is stored in a memory of the control unit 50. The memory stores a plurality of the measurements, such as the last 10 measurements. In Step 301, the control unit 50 calculates the relative speed of the vehicle and the preceding vehicle in the same manner as in Step 101 of FIG. 2. In Step 310, it is determined whether following operation is being performed by checking whether the start switch 70 has been depressed. If the start switch 70 has not been depressed, then in Step 350 normal processing is performed and the target throttle opening and target brake pressure for normal vehicle operation without performing following control are calculated.

When it is determined in Step 310 that the start switch 70 has been depressed, then in Step 320, it is determined whether the vehicle is stopped. The vehicle is determined to be stopped if the vehicle speed indicated by the vehicle speed sensor 21 is 0. If the vehicle is stopped, then in Step 321, it is determined whether the preceding vehicle has started in the same manner as in Step 121 of FIG. 2. If it is determined that the preceding vehicle has started, in Step 322 the operating mode of the vehicle is made starting mode. If in Step 321 it is determined that the preceding vehicle has not started, then in Step 380, stop processing is performed and the target throttle opening and target brake pressure for stopping the vehicle are calculated.

In Step 330, it is determined whether the operating mode is the starting mode. If it is, then in Step 331, it is determined whether the measured vehicle separation is at least a predetermined vehicle separation stored in the memory of the control unit 50. The predetermined vehicle separation is a suitable value for the vehicle separation during normal following operation, such as 5 m, and can be the same as the target vehicle separation of the preceding embodiments. If the vehicle separation is at least the predetermined vehicle separation, in Step 332, the target vehicle separation is set equal to the predetermined vehicle separation.

If in Step 331 the measured vehicle separation is less than the predetermined vehicle separation, in Step 334, the target vehicle separation is set equal to the measured vehicle separation. After Step 332 or Step 334, or after Step 330 when the operating mode is not the starting mode, following processing is performed in Step 360 and the target throttle opening and target brake pressure for following operation are calculated. In Step 360, the target drive force for use in calculating the target throttle opening is calculated using Equation (1).

The normal processing of Step 350, the following processing of Step 360, and the stop processing of Step 380 are identical to the processing of Steps 150, 160, and 180, respectively, of FIG. 2, so the details of these processing steps will not be described. After any one of Steps 350, 360, or 380 is performed, in Steps 390 and 391, the throttle valve opening and the brake pressure are set to the target values calculated in the processing steps.

The operation of the embodiment of FIG. 15 under driving conditions with frequent starts and stops is as follows. When the preceding vehicle is stopped, the vehicle being controlled is stopped by the stop processing of Step 380. When the preceding vehicle starts, if the measured vehicle separation is less than the predetermined vehicle separation, the target vehicle separation is set equal to the measured vehicle separation, and the drive force for the vehicle is controlled by the following processing of Step 360 using Equation (1). However, at this time, since the target vehicle separation equals the measured vehicle separation, the term $$K_1 \times (\text{measured vehicle separation} - \text{target vehicle separation})$$

in Equation (1) is equal to 0. Therefore, Equation (1) is reduced to the term $$K_2 \times \text{relative speed,}$$

so the target drive force at this time is determined entirely by the relative speed, just as in the embodiment of FIG. 1. As a result, the vehicle speed increases uniformly without a sudden increase in the vehicle separation.

When the vehicle separation reaches the predetermined vehicle separation, the target vehicle separation is made the predetermined vehicle separation. If the preceding vehicle stops, the brakes of the vehicle are automatically applied as part of the following processing of Step 360 and the vehicle is stopped. When the preceding vehicle again starts, the steps subsequent to Step 320 of FIG. 15 are repeated to accelerate the vehicle.

It can be seen that since the drive force during starting mode is a function only of the relative speed, the operating characteristics of a vehicle equipped with a following control apparatus according to this embodiment are essentially the same as those illustrated in FIGS. 7-9 for the embodiment of FIG. 1. Namely, at the time of starting, the vehicle speed begins to increase sooner and in a more uniform manner than for a vehicle equipped with a conventional following control apparatus. Furthermore, the acceleration of the vehicle more closely approximates that of the preceding vehicle and reaches a lower maximum value than for a vehicle equipped with a conventional control apparatus, and the vehicle separation changes less and more gradually than for a vehicle equipped with a conventional control apparatus. Thus, the ride is made more comfortable, and a fear of collision with the preceding vehicle due to sudden acceleration is not imparted to the driver.

In the embodiment of FIG. 15, the shift lever 22 is not driven by the shift lever drive mechanism 23 as part of following control. However, the control programs for this embodiment can be modified so that the shift lever 22 is operated as part of following control in the same manner as in the embodiment of FIGS. 10-14.

What is claimed is:

1. A following control apparatus for a vehicle comprising:
    a separation sensor for measuring the separation between the vehicle and a preceding vehicle;
    relative speed measuring means for measuring the relative speed of the vehicle and the preceding vehicle; and
    engine control means, responsive to the separation sensor and the relative speed measuring means, for controlling the output of an engine of the vehicle when the vehicle is starting from a standstill based on the relative speed independent of the vehicle separation so as to bring the relative speed toward 0 when the vehicle separation measured by the separation sensor has not reached a predetermined target vehicle separation, and for controlling the output of the engine based on the relative speed and the vehicle separation if the vehicle separation is at least the target vehicle separation.

2. An apparatus as claimed in claim 1 wherein the engine control means comprises:
    means for calculating a target drive force by the formula target drive force = $K_1 \times$ (measured vehicle separation − the target vehicle separation) + $K_2 \times$ relative speed when the vehicle separation is at least the target vehicle separation, and for calculating the target drive force according to the formula target drive force = $K_3 \times$ relative speed when the vehicle separation has not reached the target vehicle separation, wherein $K_1$-$K_3$ are constants; and
    means for controlling a throttle valve of the engine to attain the target drive force.

3. An apparatus as claimed in claim 2 further comprising a brake controller for applying pressure to a brake of the vehicle when the value of the target drive force is negative.

4. An apparatus as claimed in claim 3 wherein the pressure is given by the formula pressure = |target drive force| $\times K_{brk}$ when the vehicle separation is at least the target vehicle separation and is given by pressure = |target drive force| $\times K_{brk0}$ when the vehicle separation is less than the target vehicle separation, wherein $K_{brk0}$ and $K_{brk}$ are constants and $K_{brk0} > K_{brk}$.

5. A following control apparatus for a vehicle comprising:
    a speed sensor for measuring the speed of the vehicle;
    a separation sensor for measuring the separation between the vehicle and a preceding vehicle;
    relative speed measuring means for measuring the relative speed of the vehicle and the preceding vehicle; and
    engine control means responsive to the speed sensor, the separation sensor, and the relative speed measuring means for controlling the output of an engine of the vehicle based on the relative speed and the vehicle separation, the engine output being greater when the vehicle is starting from a standstill and the vehicle speed is less than a predetermined speed than when the vehicle speed is greater than the predetermined speed.

6. A following control apparatus for a vehicle comprising:
    a separation sensor for measuring the separation between the vehicle and a preceding vehicle;
    relative speed measuring means for measuring the relative speed of the vehicle and the preceding vehicle;
    means for setting a target vehicle separation, the target vehicle separation being equal to the vehicle separation measured by the separation sensor when the vehicle is starting from a standstill and the measured vehicle separation is less than a predetermined separation, and being equal to the predetermined separation when the measured vehicle separation is at least the predetermined separation; and
    means for controlling the output of an engine of the vehicle based on the relative speed and the difference between the measured vehicle separation and the target vehicle separation.

7. A following control method for a vehicle comprising:
    measuring the separation between the vehicle and a preceding vehicle;
    measuring the relative speed of the vehicle and the preceding vehicle; and
    at the time when the vehicle is starting from a standstill, controlling the output of an engine of the vehicle based on the vehicle separation and the relative speed so as to bring the vehicle separation towards a predetemined target vehicle separation if the vehicle separation is at least the target vehicle separation, and controlling the output of the engine based on the relative speed independently of the vehicle separation so as to bring the relative speed toward 0 if the vehicle separation is less than the target vehicle separation.

8. A method as claimed in claim 7 wherein the step of controlling the output of the engine comprises:
    calculating a target drive force according to the formula target drive force = $K_1 \times$ (measured vehicle separation − the target vehicle separation) + $K_2 \times$ relative speed when the vehicle separation is at least the target vehicle separation and calculating the target drive force according to the formula target drive force = $K_3 \times$ relative speed when the vehicle separation is less than the target vehicle separation wherein $K_1$-$K_3$ are constants; and
    controlling a throttle valve of the engine to attain the target drive force.

9. A method as claimed in claim 8 further comprising applying pressure to a brake of the vehicle when the value of the target drive force is negative.

10. A method as claimed in claim 9 wherein the pressure is given by the formula $$\text{pressure} = |\text{target drive force}| \times K_{brk}$$

when the vehicle separation is at least the target vehicle separation and is given by $$\text{pressure} = |\text{target drive force}| \times K_{brk0}$$

when the vehicle separation is less than the target vehicle separation, wherein $K_{brk0}$ and $K_{brk}$ are constants and $K_{brk0} > K_{brk}$.

11. A following control method for a vehicle comprising:
    measuring the separation between the vehicle and a preceding vehicle;
    measuring the relative speed of the vehicle and the preceding vehicle; and
    controlling the output of an engine of the vehicle based on the vehicle separation and the relative speed so as to bring the vehicle separation towards a predetermined target vehicle separation, the engine output being greater when the vehicle speed has yet to reach a predetermined speed after the vehicle has started from a standstill than when the vehicle speed has reached the predetermined speed.

12. A method as claimed in claim 11 wherein the step of controlling the engine output comprises:
    calculating a target drive force by the formula $$\text{target drive force} = K_1 \times (\text{measured separation} - \text{a target vehicle separation}) + K_2 \times \text{relative speed}$$

wherein $K_1$ and $K_2$ are constants; and
    controlling a throttle valve of the engine to attain the target drive force.

13. A following control method for a vehicle comprising:
    measuring the separation between the vehicle and a preceding vehicle;
    measuring the relative speed of the vehicle and the preceding vehicle;
    setting a target vehicle separation, the target vehicle separation being equal to the measured vehicle separation when the measured vehicle separation is less than a predetermined separation at the time of starting of the vehicle from a standstill, and being equal to the predetermined separation if the measured vehicle separation is at least the predetermined separation; and
    controlling the output of an engine of the vehicle based on the relative speed and the difference between the measured vehicle separation and the target vehicle separation.

* * * * *